US012311999B2

(12) United States Patent
Huber et al.

(10) Patent No.: US 12,311,999 B2
(45) Date of Patent: May 27, 2025

(54) ADJUSTMENT DRIVE FOR A STEERING COLUMN, DRIVE UNIT FOR AN ADJUSTMENT DRIVE, MOTOR-ADJUSTABLE STEERING COLUMN FOR A MOTOR VEHICLE, AND METHOD FOR PRODUCING AN ADJUSTMENT DRIVE FOR A STEERING COLUMN

(71) Applicants: thyssenkrupp Presta AG, Eschen (LI); thyssenkrupp AG, Essen (DE)

(72) Inventors: Sebastian Huber, Goefis (AT); Jean-Pierre Specht, Haag (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 914 days.

(21) Appl. No.: 17/429,120

(22) PCT Filed: Feb. 3, 2020

(86) PCT No.: PCT/EP2020/052528
§ 371 (c)(1),
(2) Date: Aug. 6, 2021

(87) PCT Pub. No.: WO2020/161032
PCT Pub. Date: Aug. 13, 2020

(65) Prior Publication Data
US 2022/0081020 A1 Mar. 17, 2022

(30) Foreign Application Priority Data
Feb. 7, 2019 (DE) .................... 10 2019 201 611.1

(51) Int. Cl.
*B62D 1/181* (2006.01)
(52) U.S. Cl.
CPC ................................. *B62D 1/181* (2013.01)

(58) Field of Classification Search
CPC ....................................................... B62D 1/181
(Continued)

(56) References Cited

U.S. PATENT DOCUMENTS

| 2011/0133584 A1 | 6/2011 | Uchimura |
| 2017/0008423 A1 | 1/2017 | Stanic et al. |
| 2017/0307053 A1 | 10/2017 | Riester et al. |

FOREIGN PATENT DOCUMENTS

| CN | 102042366 A1 | 5/2011 |
| CN | 107813733 A1 | 3/2018 |

(Continued)

OTHER PUBLICATIONS

English Translation of International Search Report issued in PCT/EP2020/052528, dated Apr. 16, 2020.
Machine Translation of DE 89 03 713.

*Primary Examiner* — T. Scott Fix
(74) *Attorney, Agent, or Firm* — thyssenkrupp North America, LLC

(57) ABSTRACT

The invention relates to an adjustment drive (5, 6) for a motor-adjustable steering column (1) for a motor vehicle, comprising a gearbox (8, 9) having a drive module (82, 92) in which a drive wheel (922) which is able to be driven in a rotating manner about a drive axis (A) and which operatively engages with a gearbox wheel (912) that is mounted in a gearbox module (81, 91) so as to be rotatable about a gearbox axis (G) and is connected to a threaded spindle (52) or a spindle nut (61) of a spindle drive is mounted, wherein the drive module (82, 92) and the gearbox module (81, 91) are connected to one another by way of at least one joining connection (93). In order for the joining connection (93) to be able to be generated with less complexity in terms of machining and assembling in a reproducible manner, it is proposed according to the invention that the drive module (82, 92) and/or the gearbox module (81, 91) for bracing the (Continued)

drive module (82, 92) and the gearbox module (81, 91) in the region of the joining connection (93) have/has at least one elastic tensioning element (94).

20 Claims, 5 Drawing Sheets

(58) Field of Classification Search
USPC .............................. 74/484 R, 486, 493, 499
See application file for complete search history.

(56) References Cited

FOREIGN PATENT DOCUMENTS

| | | |
|---|---|---|
| DE | 89 03 713 U1 | 1/1990 |
| DE | 10 2014 201 742 A1 | 8/2015 |
| DE | 10 2014 104 362 A1 | 10/2015 |
| DE | 10 2017 206 551 A1 | 6/2017 |
| DE | 10 2017 207 561 A1 | 7/2017 |
| DE | 10 2017 200 213 A1 | 7/2018 |
| JP | 2003090392 A | 3/2003 |
| WO | 2015144527 A1 | 10/2015 |

ADJUSTMENT DRIVE FOR A STEERING COLUMN, DRIVE UNIT FOR AN ADJUSTMENT DRIVE, MOTOR-ADJUSTABLE STEERING COLUMN FOR A MOTOR VEHICLE, AND METHOD FOR PRODUCING AN ADJUSTMENT DRIVE FOR A STEERING COLUMN

CROSS REFERENCE TO RELATED APPLICATIONS

This application is a U.S. National Stage Entry of International Patent Application Serial Number PCT/EP2020/052528, filed Feb. 3, 2020, which claims priority to German Patent Application No. DE 10 2019 201 611.1, filed Feb. 7, 2019, the entire contents of both of which are incorporated herein by reference.

FIELD OF THE INVENTION

The present disclosure generally relates to adjustment drives for steering columns, drive units for adjustment drives, motor-adjustable steering columns, and methods for producing adjustment drives for steering columns.

BACKGROUND OF THE INVENTION

Steering columns for motor vehicles have a steering shaft with a steering spindle, at the rear end of which in the direction of travel, which faces the driver, a steering wheel is attached for introducing a steering command by the driver. The steering spindle is mounted so as to be rotatable about its longitudinal axis in an actuator unit which is held by a support unit on the vehicle body. A longitudinal adjustment can occur by virtue of the fact that the actuator unit is received in a telescopically displaceable manner in the direction of the longitudinal axis in a casing unit, also referred to as a guide box or box-section swinging fork, connected to the support unit. A height adjustment can be implemented by virtue of the fact that the actuator unit or a casing unit receiving the latter is pivotably mounted on the support unit. The adjustment of the actuator unit in the longitudinal or height direction allows an ergonomically comfortable steering wheel position to be set relative to the driver position in an operating position, also referred to as a driving or actuating position, in which a manual steering intervention can occur. A motorized adjustment for length and height can be configured individually or in combination on a steering column.

It is known in the prior art, for the purpose of adjusting the actuator unit relative to the support unit, to provide a motorized adjustment drive. The latter comprises a drive unit having an electric actuator motor which by way of a gearbox is connected to a spindle drive that comprises a threaded spindle screwed into a spindle nut. By way of the drive unit, the threaded spindle and the spindle nut can be driven in a rotating manner with respect to one another about an axis, namely the threaded spindle axis, with the result that, depending on the direction of rotation, the threaded spindle and the spindle nut can be moved in a translatory manner toward one another or away from one another in the direction of the threaded spindle axis. In one embodiment, the threaded spindle can be driven in a rotating manner about the threaded spindle axis thereof by the drive unit, the latter being fixedly connected to the actuator unit or the casing unit or the support unit, and engages in the spindle nut, which in terms of rotation about the threaded spindle axis is connected so as to be stationary on the support unit or alternatively on the actuator unit. In the direction of the threaded spindle axis, the threaded spindle is supported on the support unit or the actuator unit, and the spindle nut is correspondingly supported on the actuator unit or alternatively on the support unit, with the result that driving the threaded spindle in a rotating manner brings about a translatory adjustment of the support unit and actuator unit relative to one another in the direction of the threaded spindle axis. This embodiment is therefore also referred to as a rotational spindle drive.

In an alternative embodiment, the threaded spindle is non-rotatably coupled to the support unit or alternatively to the actuator unit with respect to rotation about its threaded spindle axis, and the spindle nut is able to be driven in a rotating manner, but is correspondingly supported on the actuator unit or alternatively on the support unit so as to be stationary in the direction of the threaded spindle axis. As in the first embodiment, the threaded spindle is supported on the support unit or on the actuator unit in the direction of the threaded spindle axis, and the spindle nut is correspondingly supported on the actuator unit or on the support unit, such that the threaded spindle can be displaced in a translatory manner in the direction of the threaded spindle axis by virtue of the spindle nut being driven in a rotating manner by the drive unit about the threaded spindle axis. This embodiment is also referred to as a plunger spindle drive.

The driving of the spindle drive is performed by the drive unit by way of a gearbox wheel which is able to be driven in a rotating manner about the gearbox axis thereof, the latter being identical to the threaded spindle axis, and which, depending on the embodiment of the spindle drive, is connected in a rotationally fixed manner to the spindle nut or to the threaded spindle. The gearbox wheel has, for example, a toothed portion in the form of a spur gear having an externally encircling toothing or a worm toothing. The toothed portion in the axial direction is disposed between two bearing faces on the end side which encircle the axis so as to be concentric with the latter. The bearing faces are disposed in a bearing assembly between corresponding external bearing faces which are configured so as to be stationary on the actuator unit or the support unit, for example in a gearbox housing. As a result thereof, the retaining and adjusting forces which act on the gearbox wheel and the spindle drive in both axial directions of the threaded spindle axis are transmitted by way of the bearing faces to the external bearing faces on the actuator unit or the support unit, and the gearbox wheel is axially supported.

An adjustment drive of this type is known from DE 10 2014 104 362 A1, for example. This adjustment drive has a drive unit having a gearbox in which a drive wheel which by an electric actuator motor is able to be driven in a rotating manner about a drive axis and which forms a first gearbox member is mounted. This drive wheel in the known example is configured as the worm and operatively engages with the gearbox wheel which in the example is configured as a corresponding worm gear and forms a second gearbox member which is mounted in the gearbox so as to be rotatable about a gearbox axis. The gearbox wheel, in a manner coaxial with the threaded spindle axis, is connected either to the threaded spindle or the spindle nut, depending on whether a rotational spindle drive or a plunger spindle drive is implemented.

The drive wheel and the gearbox wheel are rotatably mounted in bearings, typically shaft bearings which are attached to a gearbox housing. With a view to very quiet running and minor wear, it is necessary for the bearings to be mutually positioned in an ideally precise manner in the operational engagement of the drive wheel and the gearbox wheel. In order for this to be achieved, it is proposed in DE 2017 206 551 A1 that the gearbox of the drive unit is assembled from a drive module which has the drive wheel, and a gearbox module which has the gearbox wheel. The drive module and the gearbox module are non-releasably connected to one another by a joining connection, for example by a welded connection. As a result of the drive module and the gearbox module in an assembly direction first being positioned relative to one another in an optimal operative engagement of the drive wheel and the gearbox wheel, and the joining connection then being generated, tolerances can be advantageously compensated during assembling. In order for the joining connection to be able to be generated with the required characteristics in a reproducible manner, dimensionally accurate machining and precise aligning of the joining portions of the drive module and the gearbox module that are to be joined to one another is necessary, as a result of which a higher complexity in terms of machining and assembling is created during production.

Thus, a need exists for an adjustment drive which has a reliable joining connection associated with less production complexity to be provided.

DETAILED DESCRIPTION

Figure 1:
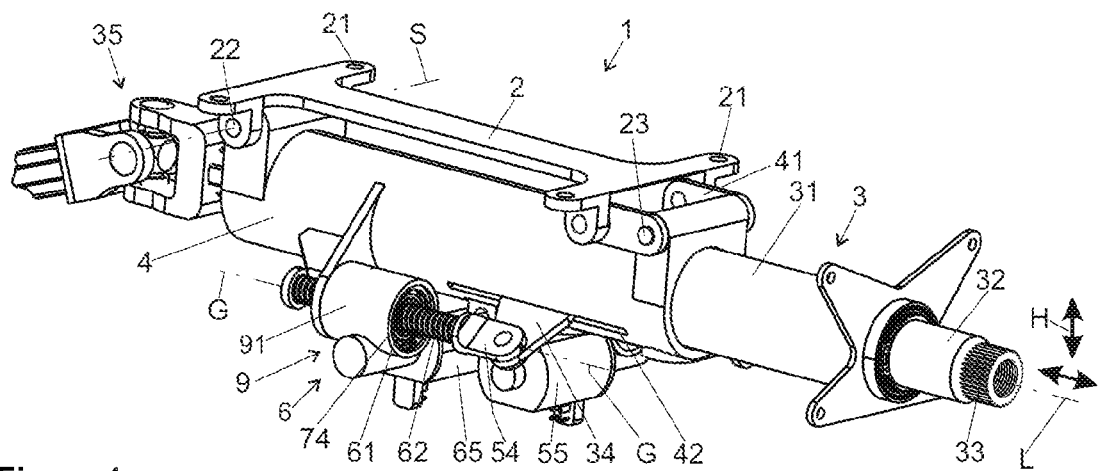
FIG. 1 is a schematic perspective view of an example steering column.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an adjustment drive for a motor-adjustable steering column for a motor vehicle. In some examples, an adjustment drive may include a gearbox having a drive module in which a drive wheel which is able to be driven in a rotating manner about a drive axis and which operatively engages with a gearbox wheel that is mounted on a gearbox module so as to be rotatable about a gearbox axis and is connected to a threaded spindle or a spindle nut of a spindle drive is mounted, wherein the drive module and the gearbox module are connected to one another by way of at least one joining connection. The present disclosure furthermore relates to a drive unit for an adjustment drive, to a motor-adjustable steering column for a motor vehicle, and to a method for producing an adjustment drive for a motor-adjustable steering column.

In an adjustment drive for a motor-adjustable steering column for a motor vehicle, comprising a gearbox having a drive module in which a drive wheel which is able to be driven in a rotating manner about a drive axis and which operatively engages with a gearbox wheel that is mounted in a gearbox module so as to be rotatable about a gearbox axis and is connected to a threaded spindle or a spindle nut of a spindle drive is mounted, wherein the drive module and the gearbox module are connected to one another by way of at least one joining connection, it is provided according to the invention that the drive module and/or the gearbox module for bracing the drive module and the gearbox module in the region of the joining connection have/has at least one elastic tensioning element.

A tensioning element according to the invention can be attached to or supported on the drive module or the gearbox module in such a manner that said tensioning element exerts an elastic tensioning force which loads the drive module and the gearbox module relative to one another in the region of the joining connection. In other words, the joining portions of the drive module and the gearbox module which are to be joined together are compressed in a joining direction of the joining connection, also referred to as the pre-tensioning direction, by the tensioning element. The joining portions are elastically pre-tensioned relative to one another, as a result of which the drive module and the gearbox module, independently of dimensional tolerances, are clamped together without play in the region of the joining connection. The joining position is fixed as a result thereof. The joining portions which are pre-tensioned relative to one another here are kept in mutual contact. The joining connection here has the desired characteristics (strength characteristics).

The joining connection is preferably configured in such a manner that the latter in the event of a crash, during which a frontal impact of the vehicle takes place and an increased force is introduced into the adjustment drive, remains without damage and the joining connection is intact even after the event of the crash such that an effective support is achieved in the event of a crash and an absorption of energy by means of an energy absorbing installation is thus made possible. Alternatively, the joining connection can be deliberately released in the event of a crash so as to separate the drive module and the gearbox module and to displace them relative to one another in this event of a crash.

A fixed, preferably non-releasable joining connection can preferably be generated by a joining method. The establishment of the joining connection can thus be simplified and optimized as a result thereof. For example, substance-to-substance joining methods such as welding or adhesive bonding, in which a defined contact between the joining portions of the mating partners has to be maintained during the joining procedure, can be applied in an optimized manner. The defined contact is guaranteed by the pre-tensioning. It can be provided that the mating partners are compressed relative to one another by a force which is externally applied in the joining direction, so as to also close any potential gaps between the joining portions that arise by virtue of dimensional tolerances. Alternatively, a substance-to-substance joining connection can be provided by a targeted thermal input, said joining connection not relying on welding filler materials, the joining connection thus being formed without filler materials. Thanks to the internal elastic fixing which according to the invention is free of play, the joining connection in the joining direction is kept together without play even after the joining operation has been completed, or in the absence of the force which is externally applied during the joining operation, such that a reliable and load-bearing substance-to-substance connection can in particular be configured in this way, for example as a result of the melts solidifying in the case of a welded connection, or as a result of the adhesive bonding curing in the case of an adhesive connection.

Pre-tensioning is to be understood to be a pre-tensioning force or a tensioning force.

In order for a particularly strong connection to be made available, it can be provided that the drive module and the gearbox module have joining portions which are directed toward one another and the tensioning element is configured for bracing the joining portions relative to one another. The pre-tensioning is generated by the tensioning element. For example, the joining portions can be formed by portions of faces which are referred to as joining faces and at least in part have directions of normals which are directed toward one another so as to be substantially anti-parallel. For example, a gearbox module can be clamped between at least one tensioning element and a support face of the drive module.

It can be provided that a joining connection is disposed on the tensioning element. The tensioning element can be attached to the drive module, for example, and have a joining portion by way of which said tensioning element, by way of the tensioning force, in the joining direction is elastically braced in relation to a corresponding joining portion on the gearbox module. After the joining connection, for example a non-releasable substance-to-substance welded connection or adhesive connection, has been generated the drive module and the gearbox module are connected to one another by way of the tensioning element. The tensioning element then functions as a connecting element or a connecting portion between the drive module and the gearbox module.

It can be advantageous for the drive module and the gearbox module to be assembled in an assembling direction which is transverse to the drive axis and/or to the gearbox axis, wherein the bracing acts in a pre-tensioning direction which is substantially perpendicular to the assembling direction. As a result thereof, the assembling can take place transversely to the tensioning force which in the pre-tensioning direction/joining direction is exerted by the tensioning element. This can be implemented in that the joining portions extend so as to be substantially parallel to the assembling direction, for example as joining faces which lie so as to be parallel to a joining face that is perpendicular to the drive axis. It is advantageous here that the assembling force exerted for assembling in the assembling direction can be decoupled from the tensioning force which acts transversely to said assembling force, so that a clamping action by the tensioning element can be maintained in a self-acting manner and without any external support once the drive module and the gearbox module have been positioned relative to one another for joining during assembling, for example. As a result thereof, the drive module and the gearbox module are held in position relative to one another until the joining operation takes place.

"Substantially" is always understood to be a variance of ±10° in comparison to the ideal state, thus the ideal perpendicular or parallel alignment.

The tensioning element can be configured as a flexible tongue. The flexible tongue forms a leaf spring which is unilaterally held on the drive module or the gearbox module and by way of the free end thereof that is deflectable in a flexible manner can exert the elastic tensioning force. A joining connection which has a joining portion, the latter being connected, preferably by way of a fixed, substance-to-substance connection, to a corresponding joining portion at the respective gearbox module or drive module disposed opposite thereto, can be situated at the free end region of the leaf spring.

A potential refinement lies in that the tensioning element is configured so as to be integral to the drive module or the gearbox module. For example, the tensioning element can be formed by a strip-shaped or tongue-shaped appendage which is unilaterally connected and represents a spring, particularly preferably an integral leaf spring.

One embodiment of the invention can provide that the drive module has fastening portions, the gearbox module being received therebetween. A concave receptacle portion or coupling portion in which the gearbox module is received is formed between the fastening portions. For assembling, the gearbox module is introduced in the assembling direction between the fastening portions by way of a corresponding coupling portion. At least one tensioning element can preferably be configured on at least one of the fastening portions, said tensioning element in the assembled state being elastically deformed such that said tensioning element exerts the tensioning force on the gearbox module and the gearbox module is elastically clamped.

At least one tensioning element can preferably be disposed on a fastening portion. For example, a preferably integral flexible tongue can extend from the fastening portion counter to the assembling direction.

In order for a tensioning force to be generated by the tensioning element, it is advantageous for the tensioning element, when assembling the drive module and the assembly module in the joining position, the latter being the optimal assembling position in which relative fixing by the joining connection takes place, to be elastically deformed and as a result thereof pre-tensioned. For example, the gearbox module transversely to the assembling direction can be oversized in comparison to the spacing of the tensioning elements or one of the tensioning elements from the fastening portion such that said oversize elastically spreads or widens the tensioning element. For example, a flexible tongue can be flexibly bent outward at the free end thereof.

The joining connection is preferably implemented in an elastically mounted joining portion of a tensioning element where said tensioning element by way of the tensioning force acting in the joining direction, preferably transversely to the assembling direction, is pressed on to a corresponding joining portion which is opposite the gearbox module or the drive module. As a result thereof, the gearbox module or the drive module are conjointly clamped.

The drive module can have a drive part housing in which the drive wheel is mounted, and the gearbox module can have a gearbox part housing in which the gearbox wheel is mounted, wherein the drive part housing is connected to the gearbox part housing by way of the joining connection. The gearbox part housing as a connecting portion or coupling portion can have at least one tubular portion which is coaxial with the gearbox axis and is encompassed by a corresponding connecting portion or coupling portion of the drive part housing at least over a circumferential sub-region, for example between projecting fastening portions.

The gearbox wheel can be coaxially mounted in the preferably hollow-cylindrical tubular portion, and depending on the embodiment of the adjustment drive be connected in a rotationally fixed manner to the threaded spindle or the spindle nut, whereby the gearbox axis coincides with the threaded spindle axis. The diameter of the tubular portion is adapted such that said tubular portion is able to be received in the coupling portion between the fastening portions of the drive part housing. A type of trench-shaped cross section which in the circumferential cross section is open so as to form at most a semicircle and in which the tubular portion is able to be received in a form-fitting manner is formed between the fastening portions here. By inserting the tubular portion in the assembling direction into the trench-shaped coupling portion, a radial spacing in relation to the gearbox axis can be freely predefined, as a result of which the relative spacing between the drive axis and the gearbox axis can be individually set according to the invention in order for tolerances to be compensated.

At least one tensioning element can preferably be configured as a flexible tongue which can preferably be implemented so as to be integral on a fastening portion, for example in a simple manner by way of a slotted fastening portion. The tensioning element by way of the free end that can be moved in an elastically flexible manner, projects in the joining direction, transversely to the assembling direction, into the open cross section of the trench-shaped coupling portion. As a result of the tubular portion, when measured in the joining direction, being oversized in comparison to the spacing between the tensioning element and the opposite fastening portion, the tensioning element is pre-tensioned and, under the spring force, by way of a joining portion lies against a corresponding joining portion of the tubular portion.

In the optimal position in which the drive wheel and the gearbox wheel operatively engage in an optimal manner, the drive part housing seated on the tubular portion is fixed between the part housings as a result of the joining connection being generated. The joining connection is preferably configured on the tensioning element, for example in the flexible free end region of a flexible tongue.

The joining connection preferably has a non-releasable connection. A non-releasable, substance-to-substance connection can be performed by means of welding or adhesive bonding, for example, advantageously in combination with a form-fitting connection. For example, form-fit elements which project in the joining direction can be configured in the joining portion, said form-fit elements when welding in the joining direction being immersed in a locally generated melt such that the form-fit elements upon solidification are embedded in an non-releasable form-fitting manner. The joining connection is particularly load-bearing if the form-fit elements are configured with undercuts in terms of the joining direction.

A non-releasable connection is understood to be a connection which cannot be released in a non-destructive manner, that is to say can be released only by destructive measures.

It can be provided that the drive module, at least in the region of the joining connection, has a thermoplastic plastics material, and that the gearbox module, at least in the region of the joining connection, has a metallic material. The joining connection in this instance can be embodied in an efficient and load-bearing manner as a thermal weld. For example, the metallic material can be electrically heated, for example by induction, in a joining portion. To this end, an inductor which is impinged with an electric current in such a manner that the metallic material of the gearbox module is at least locally heated can be used. The tensioning force which in the pre-tensioning direction/joining direction is exerted according to the invention by a tensioning element, presses a corresponding joining portion of the drive group against the heated metallic material, whereby the thermoplastic plastics material is locally fused and the latter snugly lies against the heated metallic material of the gearbox module, this generating an non-releasable connection between the drive module and the gearbox module, whereby a pre-tension in the pre-tensioning direction may be present once the thermoplastic plastics material has cooled. Because the joining portions thanks to the pre-tensioning force snugly lie against the heated metallic material, this direction—the pre-tensioning direction—in which the tensioning elements snugly lie against the heated metallic material is also referred to as the joining direction.

The locally fused thermoplastic plastics material of the drive module, due to the bracing, preferably invades clearances and/or cavities and/or and/or recesses and/or depressions and/or micro-roughnesses of the gearbox module such that a non-releasable connection is provided between the drive module and the gearbox module.

Thanks to the tensioning element according to the invention, the connection is free of play even at different temperatures; thanks to the tensioning element according to the invention, different thermal expansions by virtue of different coefficients of thermal expansion of the drive module and the gearbox module are thus compensated by virtue of the material selection mentioned.

In the joining operation, thus while at least locally heating the gearbox module, for example, no additional contact pressure tool is preferably necessary because the tensioning force is provided by the tensioning element per se.

No welding filler material is preferably required for the thermal weld; in other words, the thermal weld is free of filler materials.

Welding is also to be understood as local thermal fusing in which the material of the one module (for example the drive module) is thermally heated in such a manner that said material flows around the geometry of the other module (for example the gearbox module) and upon cooling provides a fixed connection.

Alternatively or additionally, the heat required for the local fusing can be introduced from the outside by a welding die. Alternatively, ultrasonic welding is conceivable and possible. A substance-to-substance, non-releasable joining connection between the metal and the plastics material is formed upon cooling. Form-fit elements which preferably project in the joining direction and are undercut can be provided on the metallic joining portion, said form-fit elements being non-releasably embedded in the plastics material which is fused during welding. The tensioning force which is applied according to the invention by the at least one tensioning element ensures that the drive module and the gearbox module are held in position relative to one another when the joining connection is being generated, and the joining portions remain in contact during the entire joining process such that a load-bearing welded connection is generated in a reproducible manner. Tolerance-related dimensional variances here can be compensated as a result of the disposal of at least one joining portion on the elastically deformable tensioning element, so that the complexity in terms of production can be reduced.

The invention comprises a drive unit for an adjustment drive, having a gearbox in which a drive wheel which is able to be driven in the rotating manner about a drive axis and which operatively engages with a gearbox wheel that is mounted in the gearbox so as to be rotatable about a gearbox axis is mounted, wherein the gearbox is assembled from a drive module which has the drive wheel, and a gearbox module which has the gearbox wheel, wherein the drive module and the gearbox module are connected to one another by a joining connection. The drive module and/or the gearbox module for bracing the drive module and the gearbox module in the region of the joining connection have/has according to the invention at least one elastic tensioning element.

The drive unit serves for driving the spindle drive in a rotating manner and can have the features which have been described above in the context of the adjustment unit according to the invention individually or in combination.

The invention furthermore relates to a motor-adjustable steering column for a motor vehicle, having a support unit which is able to be attached to the vehicle body and by which an actuator unit in which a steering spindle is mounted so as to be rotatable about a longitudinal axis is held, and having an adjustment drive which is connected to the support unit and to the actuator unit and by which the actuator unit is adjustable relative to the support unit, wherein the adjustment drive has a threaded spindle that engages in the spindle nut. The adjustment drive can be configured according to the invention on the steering column, as has been described above.

An adjustment drive according to the invention for a motor-adjustable steering column for a motor vehicle can be produced in a method according to the invention comprising the following steps:
  providing a drive module having a drive wheel mounted therein so as to be rotatable about a drive axis;
  providing a gearbox module having a gearbox wheel mounted therein so as to be rotatable about a gearbox axis;
  positioning the drive module and the gearbox module relative to one another in an engaging position in an assembling direction such that the drive wheel and the gearbox wheel come to operatively engage, wherein the drive module and the gearbox module are elastically braced relative to one another in a pre-tensioning direction, transverse to the assembling direction, by at least one tensioning element in the region of the joining connection;
  generating a fixed joining connection in the pre-tensioning direction for fixing the drive module and the gearbox module relative to one another.

A drive module can first be separately made, wherein the drive wheel, for example a worm, is positioned in a defined manner, for example by one mounting or a plurality of mountings of the drive shaft, the latter here being the worm shaft. The mounting can take place in a drive part housing of the drive module, preferably at the shaft end which when viewed from the actuator motor is distal from the motor, and at the motor-proximal end, likewise in a mounting in the drive part housing, or in a motor mounting of the actuator motor which is fixed to the drive part housing. The gear wheel is mounted in a gear part housing of the gear module so as to be rotatable about the gearbox axis which coincides with the threaded spindle axis.

In the next production step, the drive module and the gearbox module in the assembling direction—transverse to the drive axis and the gearbox axis—are positioned relative to one another such that the drive wheel and the gearbox wheel come to operatively engage in one another, wherein the worm meshes with the worm gear in the example mentioned. The axial spacing of the drive axis and the gearbox axis is set to an optimum gearbox play here, whereby production tolerances and dimensional tolerances of the drive wheel and the gearbox wheel as well as of the mountings can be compensated. The spacing can be optimized, for example, in that the play between the tooth flanks is monitored during the relative positioning of the drive part housing and the gearbox part housing, and/or the force acting on the engagement of the teeth in the direction of the axial spacing is measured. As a result thereof, an individual positioning of the drive wheel in relation to the gearbox wheel takes place in the production of each individual gearbox, individual tolerances being able to be taken into account and compensated in said individual positioning. It is likewise conceivable and possible for the drive wheel and the gearbox wheel to be driven when mutually positioning the drive part housing and the gearbox part housing, and for the efficiency factor to be determined, whereby the positioning is optimal once the efficiency factor reaches the highest value. The drive part housing and the gearbox part housing are then fixed relative to one another in this position. Additionally or alternatively, it can be furthermore provided that the impact sound is measured when positioning and operating the gearbox. Once the impact sound lies below a predefined limit value, the fixing of the drive part housing and the gearbox part housing to one another takes place. A particularly silent operation can thus be achieved.

The drive module and the gearbox module when being positioned in the assembling direction are elastically clamped to one another by the at least one tensioning element. For example, the tensioning element which is attached to the drive module is elastically expanded transversely to the assembling direction, i.e. in the pre-tensioning direction/joining direction, when the drive module and the gearbox module are assembled. As a result, the tensioning element exerts a tensioning force which in the joining direction presses a joining portion, preferably disposed on the tensioning element, against a corresponding joining portion disposed on the gearbox module.

Once the optimal relative positioning of the drive wheel and the gearbox wheel has been determined and set, the drive module and the gearbox module are fixed to one another by generating the joining connection between the drive part housing and the gearbox part housing. The tensioning force which is applied according to the invention while the joining connection is being generated, for example by welding, ensures a particularly reliable, reproducible joining process as has been described further above.

For fixing the drive module and the gearbox module, a joining connection of the drive part housing to the gearbox part housing can preferably be generated on a tensioning element, as has been described above.

The generating of the fixed joining connection preferably takes place by means of local fusing, for example by induction, of the tensioning element. To this end, the tensioning element of the drive part housing can preferably at least in part be formed from a thermoplastic plastics material, and the gearbox part housing, at least in the region of the joining connection, can be formed from a metallic material, preferably steel.

The drive wheel and the gearbox wheel are fixed at an optimal axial spacing and correspondingly so as to operatively engage in an optimal manner. As a result thereof, it is guaranteed that the gearbox will run in a silent manner with minor wear over its service life without additional installations for compensating dimensional tolerances being required.

An adjustment drive having the features described above, and a drive unit for an adjustment drive of this type, and a steering column comprising at least one adjustment drive of this type, can be produced by the method according to the invention.

A modular design of the gearbox is proposed in which the drive module and the gearbox module form functional modules which are joined together to produce the operative engagement of drive wheel and gearbox wheel. A particular advantage results from the fact that the two modules—drive module and gearbox module—can at first be manufactured and provided separately. The separately present modules are configured such that they can be joined to one another and, for this purpose, comprise for example joining elements which correspond to one another, for example joining surfaces. To form the gearbox, the modules are then connected to one another. Here, the modules are first of all positioned relative to one another such that the drive wheel of the drive module comes into operative engagement with the gearbox wheel of the gearbox module. An optimized orientation and alignment occurs during this positioning such that the gearbox members, namely drive wheel and gearbox wheel, are brought into engagement with one another while compensating for manufacturing-related dimensional tolerances. By virtue of the fact that this positioning of the gearbox members can occur individually for each individual gearbox, it is possible to take account of and compensate for even the slightest deviations of dimension and/or orientation of the gearbox members and their bearings. If the optimal alignment has occurred, the drive module and gearbox module are fixed to one another in a positionally accurate manner by the joining connection.

A particular advantage of a gearbox produced from modular assemblies is that even the slightest dimensional deviations, which can lead to undesired noise formation and increased wear particularly upon operative engagement of gearbox wheels, can be effectively compensated for during the manufacture of the gearbox when producing the joining connection. As a result, improved quiet running and a reduced degree of wear can be achieved. A further advantage is that the tolerance requirements placed on the individual gearbox members—drive wheel, gearbox wheel and their bearings—can be lower. As a result, a gearbox built from joined modular assemblies has better operating properties than conventional, integrated gearboxes and requires a lower manufacturing and assembly complexity.

It is possible that the drive module comprises a drive part housing in which the drive wheel is mounted, and the gearbox module comprises a gearbox part housing in which the gearbox wheel is mounted, and the drive part housing is connected to the gearbox part housing via the joining connection. The two part housings—drive part housing and gearbox part housing—each have at least one gearbox member—drive wheel or gearbox wheel—and their respective bearings for rotatable mounting about the drive or gearbox axis. Appropriate cutouts or openings which correspond to one another in the part housings allow the drive wheel and gearbox wheel to be brought into operative engagement with one another, for example through the mutual engagement of toothings. It is possible in this way for the drive and gearbox axes defined by the bearings to be oriented individually relative to one another for each individual gearbox by relative positioning of the drive part housing and gearbox part housing and to arrange them at an optimal axis distance such that the operative engagement of drive wheel and gearbox wheel is optimized. After joining the part housings, the drive wheel and gearbox wheel are fixed in a positionally fixed manner such that the optimized operative engagement of the gearbox members is ensured over the operating life of the gearbox.

The drive part housing which comprises the tensioning element according to the invention is preferably formed from a thermoplastic plastics material. The gearbox part housing is preferably formed from a metallic material.

Thanks to the tensioning element according to the invention, the connection between the drive part housing and the gearbox part housing is without play even at different temperatures; different thermal expansions by virtue of different coefficients of thermal expansion of the drive part housing and the gearbox part housing by virtue of different materials is thus compensated thanks to the tensioning element according to the invention.

The part housings having the bearings and gearbox members arranged therein can be manufactured and provided as modular assemblies which at least partially form the drive module and the gearbox module. For example, a drive part housing can comprise a drive wheel, for example in the form of a worm, and a drive wheel bearing, and a gearbox part housing can comprise a gearbox wheel, for example in the form of a worm wheel, and a gearbox wheel bearing. By virtue of the positionally accurate joining of the drive part housing and gearbox part housing to form the gearbox housing, the drive wheel and the gearbox wheel are optimally aligned with one another in operative engagement.

In order to produce the operative connection between the gearbox members when connecting the part housings, there can be provision that the drive part housing comprises, in the region of the drive wheel, and the gearbox part housing comprises, in the region of the gearbox wheel, an open engagement region, wherein the drive wheel and the gearbox wheel are in operative engagement with one another through the engagement region. The drive part housing has an engagement region open toward the gearbox part housing, and vice versa, that is to say that, in the joined-together state, there is an open passage between the part housings in the engagement region. For example, the drive wheel designed as a worm projects from the drive part housing in the engagement region and plunges through the engagement region into the gearbox part housing, where it meshes with the toothing of the gearbox wheel designed as a worm wheel.

It is advantageous that the drive module and the gearbox module have corresponding joining elements. The drive module and the gearbox module are connected to one another and mutually fixed at the joining elements, whereby these fixing elements may form the tensioning elements. The joining elements can comprise, for example, form-fit elements which allow an unambiguous orientation of the modules in one or more spatial directions. Furthermore, it is advantageous that the joining elements offer degrees of freedom with respect to the relative positioning, for example by means of guide surfaces and/or edges which allow guidance or support in at least one spatial direction while, for example, a relative movement or displacement of the drive module and gearbox module is possible in at least one other spatial direction, in order for example to adjust the axis distance between the drive wheel and gearbox wheel.

The joining elements can be designed for specific types of joining connections in terms of arrangement, shaping, material, surface structure and the like. For example, welding preparations with material arrangements for the optimized production of a welding connection can be provided, or structured surfaces for the production of integrally bonded connections by means of adhesive bonding or brazing can be provided, or receptacles for connecting elements such as screws, rivets or the like can be provided. The joining elements are preferably arranged on the drive part housing and/or the gearbox part housing and allow the positioning and joining together of the drive module and gearbox module.

The joining connection can comprise a form-fitting and/or force-fitting and/or integrally bonded connection. A non-releasable connection can occur, for example in an integrally bonded manner by welding, ultrasonic welding or adhesive bonding, or else in a form-fitting manner by riveting, seaming, flanging, clinching or caulking. Additionally or alternatively, a releasable connection can occur, for example by means of screwing.

An advantageous embodiment provides that the gearbox part housing comprises at least one preferably cylindrical tubular portion which is coaxial to the gearbox axis and which is encompassed by the drive part housing at least over a circumferential sub-region.

It can be provided that the drive wheel is coupled so as to be coaxial with the motor shaft of an actuator motor, and the gearbox wheel is connected to a threaded spindle or a spindle nut. The drive wheel can be disposed on the motor shaft, for example, or on a drive shaft which is coupled to the motor shaft. The motor shaft or the drive shaft at the motor end can be mounted in the motor or in at least one bearing in the drive part housing, and at the motor-distal end of said shaft be mounted in a bearing in the drive part housing such that a defined orientation takes place in the drive module.

The actuator motor can be connected in a positionally fixed manner to the drive module, preferably in that the actuator motor is attached to the drive part housing, for example by means of a flanged connection, wherein protrusions of the drive part housing protrude through clearances of the actuator motor and by means of a hot-caulking operation are deformed in such a manner that a non-releasable connection is provided.

One embodiment of the invention provides that the drive axis and the gearbox axis are substantially perpendicular to one another and have a mutual spacing which is predefined by the axial spacing of the drive wheel and the gearbox wheel when operatively engaging. Substantially perpendicular is to be understood to be a variance of up to ±10° from an ideally perpendicular arrangement. In the case of gear wheels, this is the sum of the pitch circle radii. In an embodiment as a worm gear mechanism, the axial spacing is determined by the pitch circle radius of the worm gear and the reference circle radius of the worm. As a result of the drive axis being defied by a mounting disposed in the drive module, and the gearbox axis being defined by a mounting disposed in the gearbox module, the drive wheel and the gearbox wheel as a result of the joining connection of the modules according to the invention can be fixed by way of an individually optimized operative engagement while being optimally aligned.

The afore-mentioned embodiment can be implemented in that the drive wheel is configured as a worm, and the gearbox wheel is configured as a worm gear. The worm as a component part of the drive module is preferably mounted in a drive part housing. The mounting can take place in a shaft bearing disposed in the drive part housing, and/or in a motor bearing of the actuator motor which is connected to the drive part housing. The worm gear is mounted in the gearbox part housing. The drive part housing and the gearbox part housing have corresponding engagement openings through which the worm and the worm gear can be brought to mesh in an operative engagement.

Figure 2:
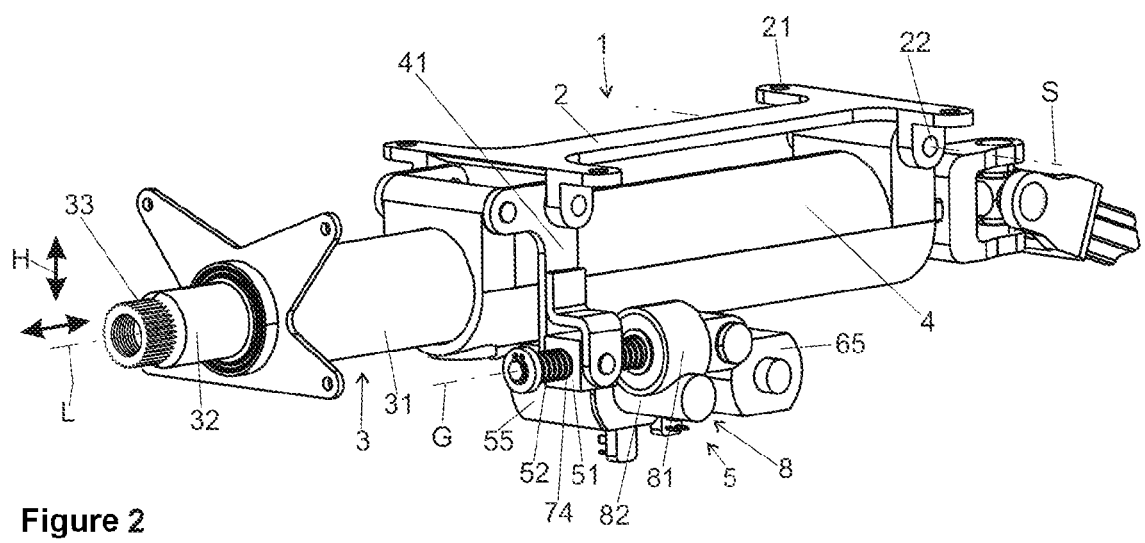
FIG. 2 is another perspective view of the steering column from FIG. 1.

FIG. 1 shows, from obliquely top right, a steering column 1 according to the invention in a schematic perspective view of the rear end with respect to the direction of travel of a vehicle (not shown), where a steering wheel (not shown here) is held in the operating region. FIG. 2 shows the steering column 1 in a view from the opposite side, that is to say as seen from top right.

The steering column 1 comprises a support unit 2 which is designed as a bracket which comprises fastening means 21 in the form of fastening holes for attachment to a vehicle body (not shown). The support unit 2 holds an actuator unit 3 which is received in a casing unit 4—also referred to as a guide box or box-section swinging fork.

The actuator unit 3 comprises a casing tube 31 in which a steering spindle 32 is mounted so as to be rotatable about a longitudinal axis L, said steering spindle extending axially in the longitudinal direction, that is to say in the direction of the longitudinal axis L. At the rear end, a fastening portion 33 to which a steering wheel (not shown) can be attached is formed on the steering spindle 32. At the front end, the steering spindle 32 is connected to a fork of a universal joint 35 in a torque-transmitting manner.

In order to realize a longitudinal adjustment, the actuator unit 3 is received in the casing unit 4 so as to be telescopically displaceable in the direction of the longitudinal axis L so that the steering wheel connected to the steering spindle 32 can be positioned forward and backward in the longitudinal direction relative to the support unit 2, as indicated by the double arrow parallel to the longitudinal axis L.

The casing unit 4 is mounted in its front end region in a pivot bearing 22 on the support unit 2 so as to be pivotable about a horizontal pivot axis S situated transversely to the longitudinal axis L. In the rear region, the casing unit 4 is connected to the support unit 2 via a rotatable actuation lever 41. As a result of a rotational movement of the actuation lever 41 by means of an illustrated actuator drive 5 (see FIG. 2), the casing unit 4 can be pivoted relative to the support unit 2 about the pivot axis S which lies horizontally in the installed state, whereby it is possible to carry out an adjustment of a steering wheel attached to the fastening portion 33 in the vertical direction H, which is indicated by the double arrow.

A first adjustment drive 6 for longitudinally adjusting the actuator unit 3 relative to the casing unit 4 in the direction of the longitudinal axis L comprises a spindle drive having a spindle nut 61 with an internal thread 74 in which a threaded spindle 62 extending along a threaded spindle axis G engages, that is to say is screwed by its external thread into the corresponding internal thread 74 of the spindle nut 61. The threaded spindle axis G of the threaded spindle 62 extends substantially parallel to the longitudinal axis L.

The spindle nut 61 is mounted in a gearbox housing 91 so as to be rotatable about the threaded spindle axis G in a gearbox 8, which gearbox housing is fixedly connected to the casing unit 4. In the direction of the threaded spindle axis G, which is also referred to below with the same meaning as gearbox axis G, the spindle nut 61 is supported axially on the casing unit 4 via the gearbox housing 91.

The threaded spindle 62 is connected by way of a fastening element 54 formed on its rear end to the actuator unit 3 via a transmission element 34, specifically so as to be stationary in the direction of the threaded spindle axis G or the longitudinal axis L and so as to be stationary with respect to rotation about the threaded spindle axis G. A so-called plunging spindle drive is implemented by the rotationally drivable spindle nut 61 and the threaded spindle 52 which is fixed with respect to rotation.

The transmission element 34 extends from the actuator unit 3 through a slot-shaped through-opening 42 in the casing unit 4. To adjust the steering column 1 in the longitudinal direction, the transmission element 34 can be moved along freely in the longitudinal direction in the through-opening 42.

The adjustment drive 6, configured as a plunger spindle drive, comprises an electric actuator motor 65 by which the spindle nut 61 can be driven in a rotating manner with respect to the threaded spindle axis G relative to the fixed threaded spindle 62. It is thus possible—depending on the direction of rotation of the actuator motor 65—for the threaded spindle 62 to be displaced in the direction of the axis G in a translatory manner relative to the spindle nut 61, with the result that correspondingly the actuating device 3 connected to the threaded spindle 52 is adjusted relative to the casing unit 4 connected to the spindle nut 61 in the direction of the longitudinal axis L. The drive of the spindle nut 61 will be explained in more detail below.

In FIG. 2, which shows a perspective view of the steering column 1 from the side situated to the rear in FIG. 1, it can be seen how a second adjustment drive 5 for adjustment in the vertical direction H is attached to the steering column 1. This adjustment drive 5 comprises a spindle nut 51 in whose internal thread 74 a threaded spindle 52 engages along a threaded spindle axis G. The adjustment drive comprises a gearbox in which the threaded spindle 52 is mounted so as to be rotatable in a gearbox housing 81, which is fastened to the casing unit 4, about the threaded spindle axis G, which is referred to with the same meaning as a gearbox axis G, and is axially supported, in the direction of the threaded spindle axis G, on the casing unit 4. The threaded spindle 52 can be selectively driven in a rotating manner about the threaded spindle axis G in both directions of rotation by an electric actuator motor 55.

The spindle nut 51 is attached so as to be stationary with respect to a rotation about the threaded spindle axis G on one end of the two-arm actuation lever 41, which is mounted on the support unit 22 so as to be rotatable about a pivot bearing 23, and its other arm is connected by the other end to the casing unit 4.

By rotating the threaded spindle 51 it is possible—depending on the direction of rotation of the actuator motor 55—for the spindle nut 51 to be displaced in a translatory manner relative to the threaded spindle 52 in the direction of the threaded spindle axis G, with the result that correspondingly the casing unit 4 connected to the spindle nut 51 via the actuation lever 41, together with the actuating device 3 received in said casing unit, can be adjusted up or down relative to the support unit 2 in the vertical direction H, as indicated by the double arrow.

A so-called rotational spindle drive is implemented by the rotationally drivable threaded spindle 52 and the spindle nut 51 which is fixed with respect to rotation.

The invention in the example illustrated relates to the design of a gearbox housing 8 or 9, the latter being substantially only distinguished in that, in the gearbox housing 8, it is the threaded spindle 52 which is mounted so as to be rotatable about the respective threaded spindle axis G and is mounted so as to be stationary in the axial direction, and, in the gearbox housing 9, it is the spindle nut 61. In the following, FIGS. 3 to 8 will be used to explain exemplary embodiments of the gearbox housing 9 of the adjustment drive 6 designed as a plunger spindle drive, wherein the features can be transferred to the embodiment of a gearbox housing 8 for an adjustment drive 5 designed as a rotational spindle drive by virtue of the fact that, instead of the threaded spindle 62, the spindle nut 51 is arranged in a rotationally drivable manner. In other words, the type of the adjustment drive is not inseparably linked to the design embodiment of the gearbox housing.

Figure 3:
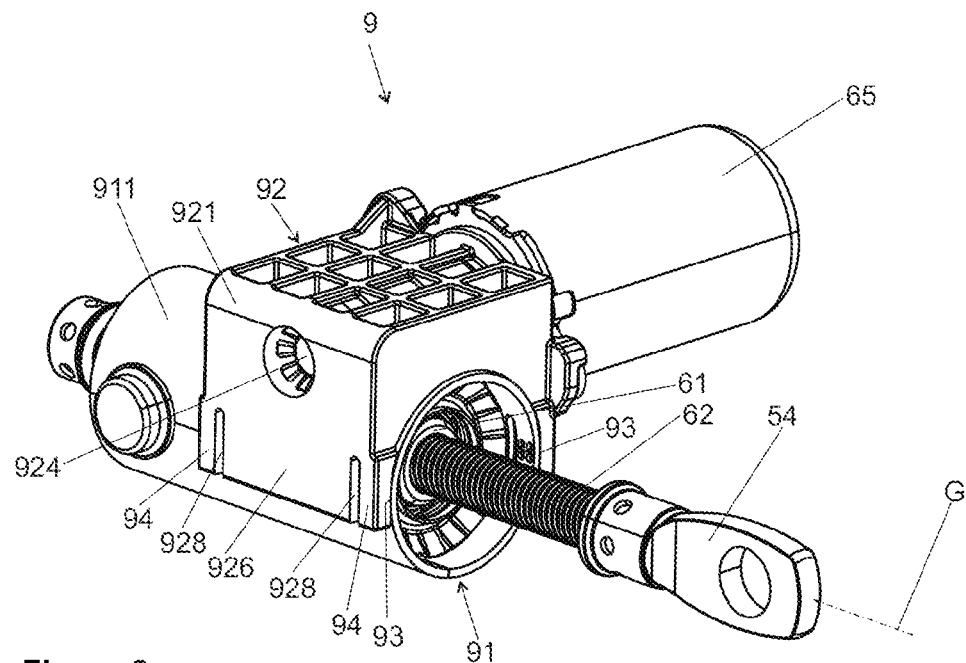
FIG. 3 is a schematic view of an example adjustment drive of the steering column from FIGS. 1 and 2.
Figure 4:
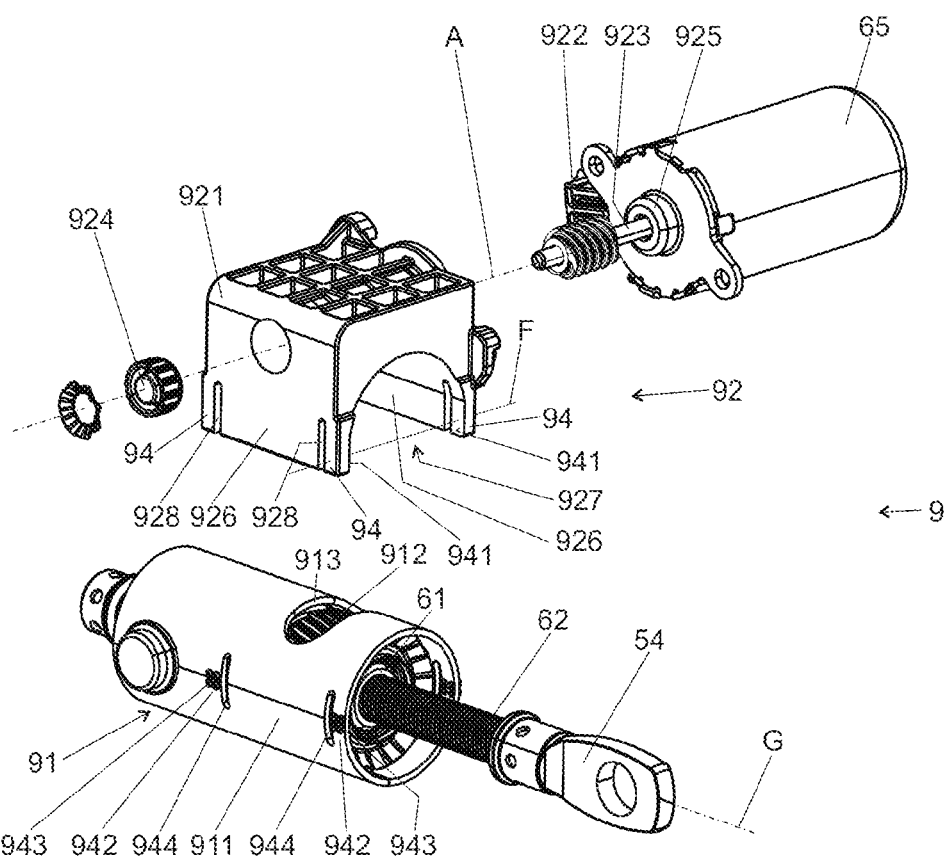
FIG. 4 is an exploded view of the adjustment drive according to FIG. 3.
Figure 5:
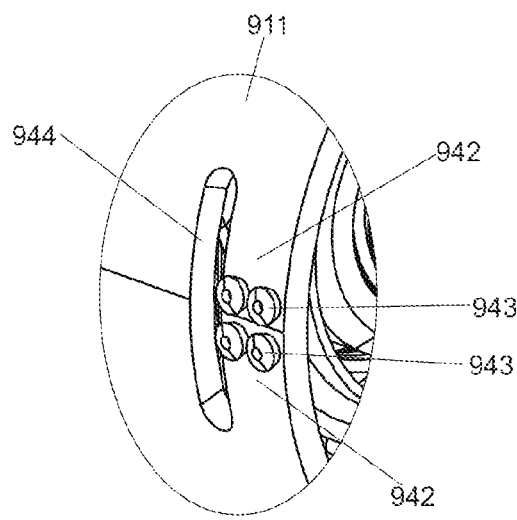
FIG. 5 is a detail view of a gearbox module of the adjustment drive according to FIG. 4.
Figure 6:
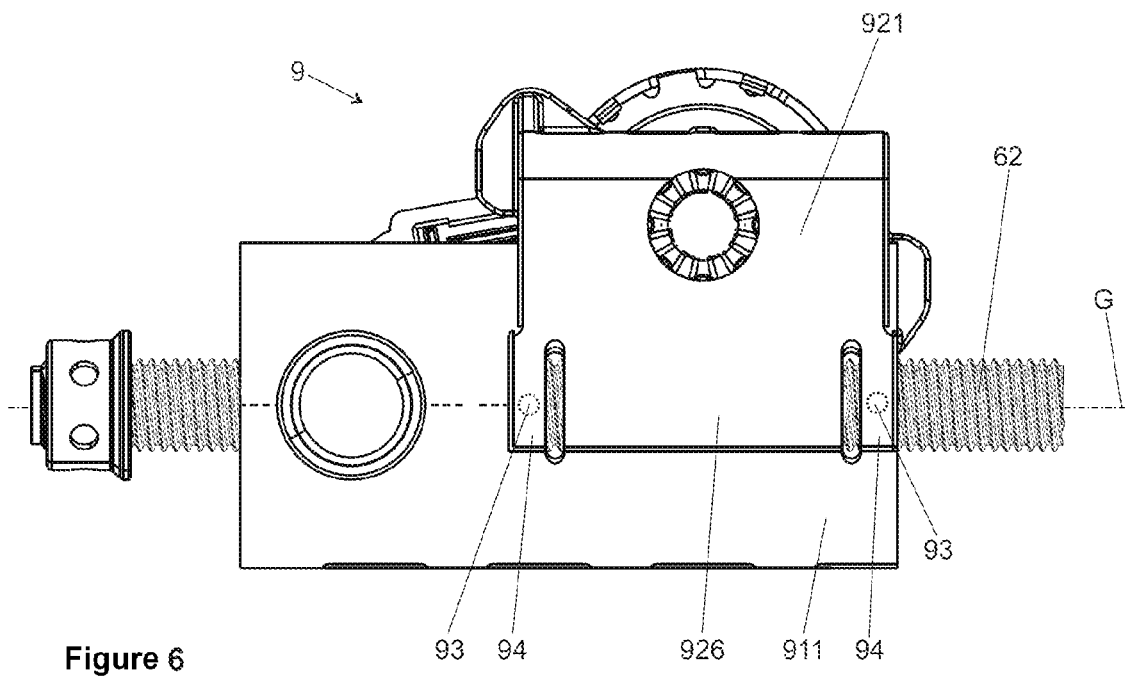
FIG. 6 is a lateral view of the adjustment drive according to FIG. 3.

FIG. 3 shows the adjustment drive 6 in the assembled state. In FIG. 4, the key functional parts are shown pulled apart from one another in an exploded illustration. FIG. 5 shows an enlarged detailed view of FIG. 4. FIG. 6 shows a lateral view, transverse to the gearbox axis G.

The gearbox housing 91 of the gearbox 9 is assembled according to the invention from a drive module 92 and a gearbox module 91.

The drive module 92 comprises a drive part housing 921 in which there is rotatably mounted a drive wheel which is designed as a worm 922 and which is fastened to a driveshaft 923 which extends in the direction of a drive axis A. The worm 922 is preferably fastened to the driveshaft 923 by means of a transverse interference fit. This offers the advantage that there is no need for high contact pressure forces as in the case of a longitudinal interference fit. The worm 922 is preferably inductively heated before the joining operation and then pushed onto the driveshaft 923 with little application of force, with the result that the worm 922 is shrunk on the driveshaft 923 after cooling. The driveshaft 923 can be rotationally driven by the actuator motor 65, with the motor shaft thereof being able to form the driveshaft 923 or being coupled thereto at least in a torque-transmitting manner. The actuator motor 65 is flanged onto the drive part housing 921 and connected thereto, wherein the driveshaft 923 is rotatably mounted, at its end distal from the motor, in a bearing 924 in the drive part housing 921, and, in its region proximal to the motor, in a motor bearing 925 which, together with the actuator motor 65, is likewise fixed in the drive part housing 921.

The gearbox module 91 has a tubular gearbox part housing 911 which is configured so as to be hollow-cylindrical and coaxial with the gearbox axis G and in which a gearbox wheel designed as a worm wheel 912 is mounted so as to be rotatable about the gearbox axis G. The worm wheel 912 is connected to the threaded spindle 62 in a rotationally fixed manner. As can be seen in FIG. 4, the gearbox part housing 911 comprises an engagement opening 913 in the region of the worm wheel 912.

The drive part housing 921 has fastening portions 926 which are disposed on an at least partially hollow-cylindrical receptacle region 927 and in terms of the gearbox axis G lie opposite one another in a pre-tensioning direction or joining direction F. The receptacle region 927 which is formed between the fastening portions 926 approximately has the shape of a trench which extends in the direction of the gearbox axis G and has a semicircular, open cross section which is designed for receiving in a form-fitting manner the externally cylindrical drive part housing 911.

The drive module 92 is connected to the gearbox module 91 by way of joining connections 93 which in the example shown are embodied as welds.

The drive module 92, at least in the region of the joining connection 93, is configured from a thermoplastic plastics material; for example, the drive part housing 921 can be made as a plastics injection-molded part from a thermoplastic plastics material. The gearbox part housing 911 of the gearbox module 91 can preferably be configured from a metallic material, for example from steel.

The drive module 92 has a total of four tensioning elements 94 which are configured as elastic flexible tongues. The tensioning elements 94 on the internal side thereof that faces the gearbox part housing 911, in the free spring-elastic end region of said tensioning elements 94, have joining portions 941. The tensioning elements 94 by way of slots 928 in the fastening portions 926 are configured so as to be integral to the drive part housing 921.

The tensioning elements 94 by way of the joining portions 941, in the joining direction F, the latter being transverse to the gearbox axis G, lie opposite corresponding joining portions 942 which are on the outside on the gearbox part housing 911. Form-fit elements 943 which project outward, counter to the joining direction F, and are preferably undercut in terms of the joining direction F, are configured in the region of the joining portions 942, as can be readily seen in the enlarged detailed illustration of FIG. 5.

The joining portions 942 are in each case delimited in relation to the gearbox part housing 911 by one insulation slot 944.

For the production, one drive module 92 and one gearbox module 91 are provided and disposed and aligned as shown in FIG. 6. Subsequently, the drive module 92 is moved in the assembling direction M, perpendicular to the drive axis A and perpendicular to the gearbox axis G, toward the gearbox module 91 until the gearbox part housing 911 is received in the receptacle region 927 between the tensioning elements 94. The gearbox part housing 911 here is positioned relative to the drive part housing 921 in a manner transverse to the gearbox axis G until the optimal engagement spacing between the drive axis A and the gearbox axis G is adjusted, whereby the worm 922 plunges through the engagement opening 913 and engages in the worm gear 912, the optimal operative engagement of the worm 922 and the worm gear 912 being generated.

The joining portions 941 which are disposed so as to be opposite one another on the internal sides of the tensioning elements 92, when measured in the pre-tensioning direction or joining direction F which is transverse to the assembling direction M, have a mutual spacing x. Measured across the form-fit elements 943, the gearbox part housing 911 has a diameter D which is larger than the spacing x; thus: D>x. As a result thereof, the tensioning elements 94 are elastically spread apart counter to the joining direction F when the gearbox module 91 is being inserted, as is indicated by the arrows in FIG. 6, and thus elastically pre-tensioned. The tensioning elements 94 here, as a restoring force exerted in the elastic tensioning force by way of which the joining portions 941 and 941 are pressed against one another in the joining direction F.

Figure 7:
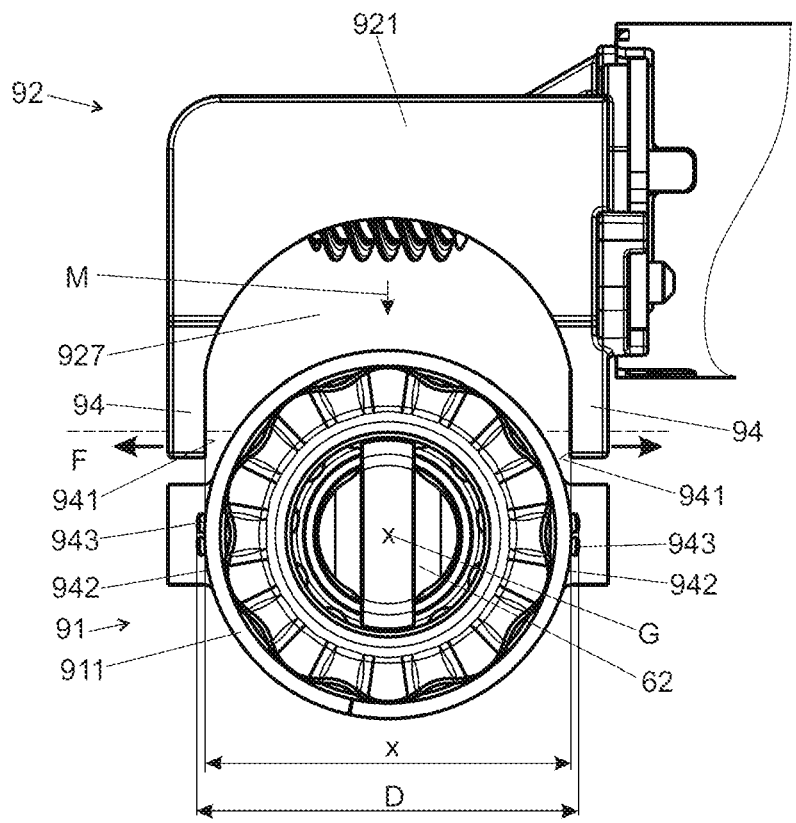
FIG. 7 is a front view of the adjustment drive according to FIG. 3 in a direction of a gearbox axis, prior to assembly.

Once the drive module 92 and the gearbox module 91 are positioned relative to one another so as to operatively engage, thermal energy is introduced into the joining region 941 by means of an inductor 95, as is illustrated in FIG. 7, in that the gearbox part housing 911 is locally heated in the region of the joining portions 942, for example by induction in that the inductor is impinged with an electric current. Alternatively, it can also be provided that the thermal energy is introduced into the joining connection by hot embossing or by means of ultrasound, for example. In each case, the plastics material in the joining region 941 here is locally fused, and the form-fit elements 93, on account of the tensioning force exerted by the tensioning elements 94 in the joining direction F, thus in the pre-tensioning direction, are plastically molded into the fused soft joining region 941. After cooling, the plastics material of the drive module 92 is connected in a substance-to-substance and non-releasable manner to the gearbox module 91, whereby the form-fit elements 93 are embedded in a form-fitting manner in the plastics material. As a result thereof, the spacing between the drive axis A and the gearbox axis G is fixed at an optimal operative engagement of the worm 922 and the worm gear 912. The introduction of the thermal energy preferably takes place in such a manner that the tensioning elements after cooling still provide a residual tensioning force.

The form-fit elements 943 are preferably configured such that the free end has a larger width than the portion configured on the gearbox part housing 911. As a result, an undercut can be provided such that these form-fit elements 943 are enclosed by the fused plastics material and after cooling provide a form-fitting connection. The form-fit elements 943 are preferably configured as a local plastic deformation portion, the latter being indentations of the gearbox part housing.

The joining portions 942 are thermally insulated in relation to the gearbox part housing 911 by the installation slots 944 such that the heating of said gearbox part housing 911 is minimized during the welding process.

Figure 8:
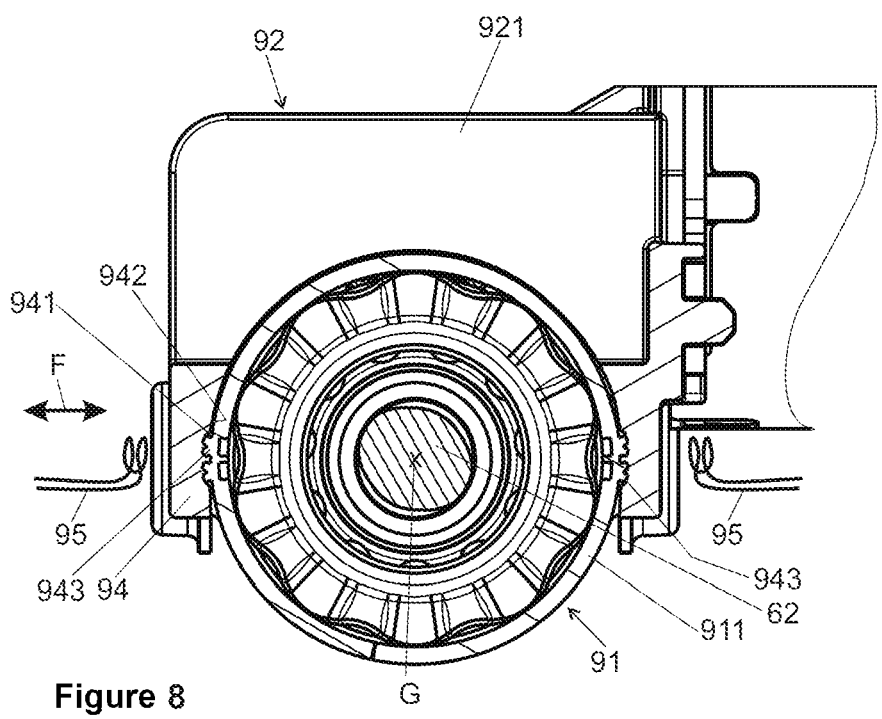
FIG. 8 is a front view of an adjustment drive, after assembly.
Figure 9:
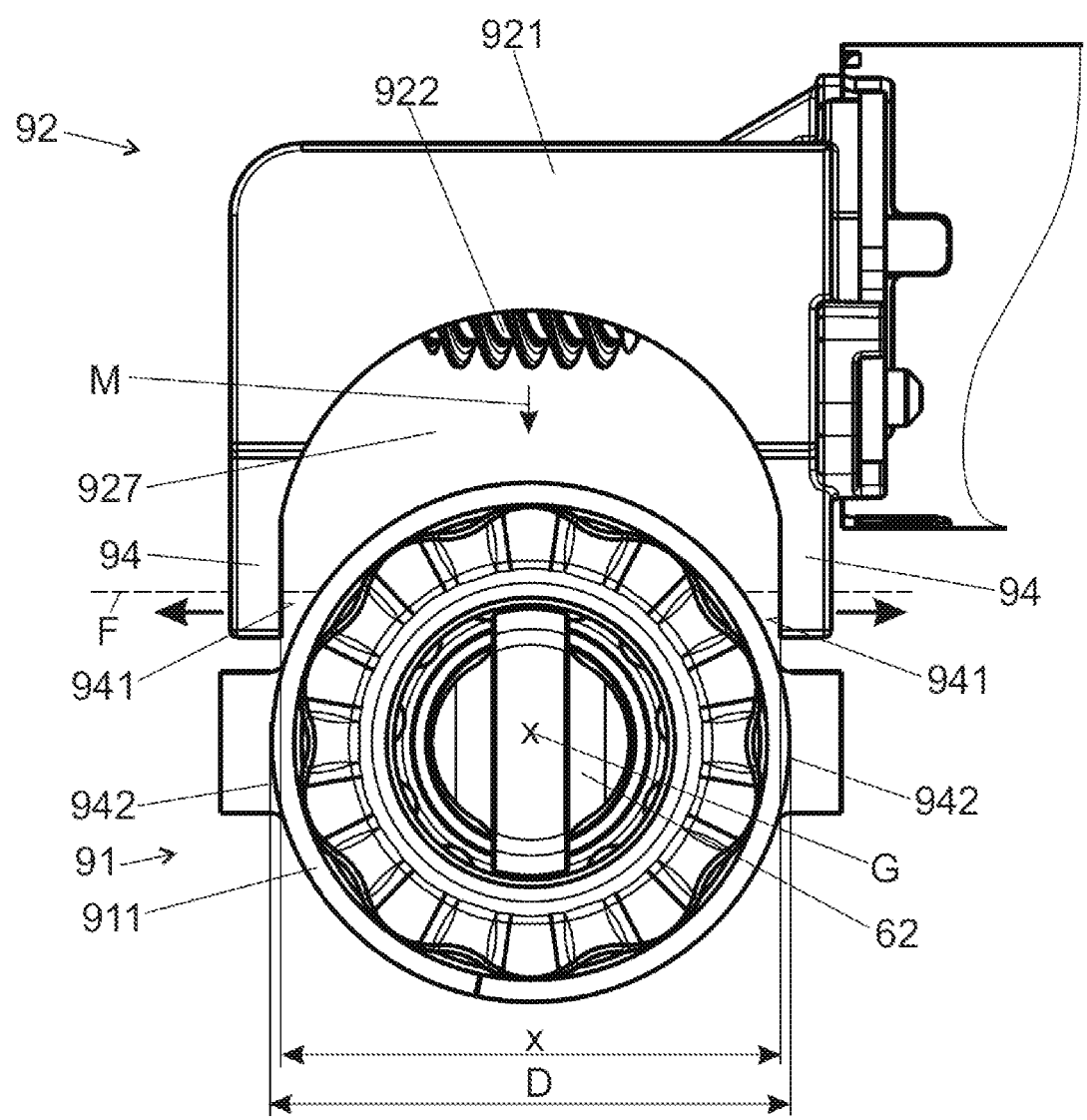
FIG. 9 is a front view of another example adjustment drive.

FIG. 8 in the same view as in FIG. 6 shows a variant of the invention. The cylindrical, tubular gearbox part housing 911 here has a continuous external diameter D which is larger than the spacing x measured in the joining direction F between the joining regions 941 which lie opposite one another on the inside of the tensioning elements 94. As a result, the tensioning elements 94, when assembling in the assembling direction M, are elastically spread apart, as is indicated by the arrows. The tensioning force as an elastic restoring force mutually compresses the joining portions 941 and 942 in the joining direction F, thus the pre-tensioning direction, even when no external joining forces are exerted. As has been described above, a reliable and load-bearing joining connection can be generated in a reproducible manner as a result, for example by introducing thermal energy by way of an energized inductor.

An advantage of the configuration according to the invention is that the joining portions 941 and 942, as a result of the pre-tensioned tensioning elements 94, can be kept in contact even after cooling, even when dimensional variances arise which, without the pre-tensioning according to the invention, could otherwise lead to an undesirable formation of gaps between the joining portions 941 and 942. Furthermore, expansion effects by virtue of different coefficients of thermal expansion of the joining portions 941 and 942 can be effectively compensated.

LIST OF REFERENCE SIGNS

1 Steering column
2 Support unit
21 Fastening means
22, 23 Pivot bearing
3 Actuator unit
31 Casing tube
32 Steering spindle
33 Fastening portion
34 Transmission element
4 Casing unit
41 Actuation lever
42 Through-opening
5, 6 Adjustment drive
51, 61 Spindle nut 52, 62 Threaded spindle
54 Fastening element
55, 65 Actuator motor
74 Internal thread
8, 9 Gearbox
81, 91 Gearbox housing
91 Gearbox module
911 Gearbox part housing
912 Worm gear
913 Engagement opening
92 Drive module
921 Drive part housing
922 Worm
923 Drive shaft
924 Bearing
925 Bearing
926 Fastening portions
927 Receptacle region
928 Slot
93 Joining connection
94 Tensioning elements
941 Joining portions
942 Joining portions
943 Form-fit element
944 Insulation slot
95 Inductor
L Longitudinal axis
H Height direction
G Threaded spindle axis (Gearbox axis)
A Drive axis
F Joining direction/Pre-tensioning direction
M Assembling direction
x Spacing
D Diameter

What is claimed is:

1. An adjustment drive for a motor vehicle, the adjustment drive comprising:
a gearbox having a drive module in which a drive wheel is mounted, wherein the drive wheel is drivable in a rotating manner about a drive axis and operatively engages with a gearbox wheel that is mounted in a gearbox module so as to be rotatable about a gearbox axis, the gearbox wheel being connected to a threaded spindle or a spindle nut of a spindle drive, wherein the drive module and the gearbox module have respective joining sections directed towards one another; and
a joining connection that connects the joining sections of the drive module and the gearbox module, wherein for bracing the drive module and the gearbox module in a region of the joining connection, at least one of the drive module or the gearbox module has an elastic tensioning element that tensions the joining sections against one another and the other of the drive module and the gearbox module has a form- fit element with an undercut, wherein the elastic tensioning element is engaged with the undercut of the form-fitting element to form the joining connection.

2. The adjustment drive of claim 1 wherein the joining connection is disposed on the elastic tensioning element.

3. The adjustment drive of claim 1 wherein the drive module and the gearbox module are assembled in an assembling direction that is transverse to at least one of the drive axis or the gearbox axis, wherein bracing from the elastic tensioning element acts in a pre-tensioning direction that is substantially perpendicular to the assembling direction.

4. The adjustment drive of claim 1 wherein the elastic tensioning element is a flexible tongue.

5. The adjustment drive of claim 1 wherein the tensioning element is integral to the drive module or the gearbox module.

6. The adjustment drive of claim 1 wherein the drive module includes fastening portions, wherein the gearbox module is received between the fastening portions.

7. The adjustment drive of claim 1 wherein the joining connection has a non-releasable connection.

8. The adjustment drive of claim 1 wherein the drive module has a thermoplastic plastics material at least in the region of the joining connection, wherein the gearbox module comprises metallic material at least in the region of the joining connection.

9. A drive unit for an adjustment drive comprising a gearbox with a drive wheel that is drivable in a rotating manner about a drive axis and operatively engages with a gearbox wheel that is mounted in the gearbox so as to be rotatable about a gearbox axis, wherein the gearbox is assembled from a drive module that has the drive wheel and a gearbox module that has the gearbox wheel, wherein the drive module and the gearbox module include respective joining sections that are directed towards one another and are connected via a joining connection, wherein for bracing the drive module and the gearbox module in a region of the joining connection at least one of the drive module or the gearbox module has an elastic tensioning element that tensions the joining sections against one another and the other of the drive module and the gearbox module has a form-fit element with an undercut, wherein the elastic tensioning element is engaged with the undercut of the form-fitting element to form the joining connection.

10. A motor-adjustable steering column for a motor vehicle, comprising:
a support unit that is attachable to a vehicle body, wherein the support unit holds an actuator unit in which a steering spindle is mounted so as to be rotatable about a longitudinal axis; and
the adjustment drive of claim 1, wherein the adjustment drive is connected to the support unit and to the actuator unit, wherein the adjustment drive permits adjustment of the actuator unit relative to the support unit, wherein the adjustment drive includes a threaded spindle that engages a spindle nut.

11. A method for producing an adjustment drive for a motor- adjustable steering column for a motor vehicle, the method comprising:
providing a drive module having a drive wheel mounted therein so as to be rotatable about a drive axis;
providing a gearbox module having a gearbox wheel mounted therein so as to be rotatable about a gearbox axis;
positioning the drive module and the gearbox module relative to one another in an engaging position in an assembling direction such that the drive wheel and the gearbox wheel come to operatively engage, wherein the drive module and the gearbox module in a region of a fixed joining connection are elastically braced relative to one another by a tensioning element in a pre-tensioning direction that is transverse to the assembling direction, wherein the tensioning element is configured to engage with an undercut of a form-fitting element to form the fixed joining connection; and
generating the fixed joining connection for fixing the drive module and the gearbox module relative to one another.

12. The method as claimed in claim 11 comprising generating the fixed joining connection between a drive part housing and a gearbox part housing for fixing the drive module and the gearbox module.

13. The method as claimed in claim 12 wherein generating the fixed joining connection includes introducing thermal energy into a joining region using an inductor.

14. The method as claimed in claim 13 wherein generating the fixed joining connection includes introducing the thermal energy using the inductor into the gearbox part housing.

15. The method as claimed in claim 13, further comprising plastically molding the form-fit elements into the joining region, wherein, after the plastic molding, the tensioning element after cooling still provides a residual tensioning force.

16. The method as claimed in claim 12 wherein generating the fixed joining connection includes introducing thermal energy into a joining region using hot embossing.

17. The method as claimed in claim 12 wherein generating the fixed joining connection includes introducing thermal energy into a joining region using ultrasound.

18. The adjustment drive of claim 1 wherein a plastics material of the drive module is connected in a substance-to-substance and non-releasable manner to the gearbox module.

19. The adjustment drive of claim 1 wherein the form-fit element is embedded in a form-fitting manner in a plastics material of the drive module.

20. The adjustment drive of claim 1 wherein the other of the drive module and the gearbox module has plural form-fit elements each with a respective undercut, wherein the elastic tensioning element is engaged with each of the undercuts of the form-fitting elements to form the joining connection.

* * * * *